United States Patent [19]

Pringle

[11] 4,145,896

[45] Mar. 27, 1979

[54] CONSTANT VELOCITY JOINT

[75] Inventor: William L. Pringle, Grosse Pointe Shores, Mich.

[73] Assignee: United States Steel Corporation, Pittsburgh, Pa.

[21] Appl. No.: 809,637

[22] Filed: Jun. 24, 1977

[51] Int. Cl.² .......................... F16D 3/30; F16D 3/02
[52] U.S. Cl. .............................................. 64/21; 64/7; 64/8
[58] Field of Search ...................... 64/7, 8, 21; 403/53, 403/57, 61

[56] References Cited

U.S. PATENT DOCUMENTS

| | | | |
|---|---|---|---|
| 1,225,174 | 5/1917 | Ream | 64/8 |
| 1,524,161 | 1/1925 | Weiss | 64/7 |
| 1,887,106 | 11/1932 | Shierk | 64/7 |
| 2,182,455 | 12/1939 | Smith | 64/7 |
| 2,293,717 | 8/1942 | Dodge | 64/21 |
| 2,487,485 | 11/1949 | Smiley, Jr. | 64/7 |
| 2,510,362 | 6/1950 | Anderson | 64/8 |
| 2,625,018 | 1/1953 | Dunn | 64/7 |
| 2,672,740 | 3/1954 | Dunn | 64/21 |
| 3,008,311 | 11/1961 | Mazziotti | 64/8 |
| 3,029,617 | 4/1962 | Marquis et al. | 64/8 |
| 3,098,365 | 7/1963 | Pearson | 64/7 |
| 3,107,505 | 10/1963 | Koss | 64/21 X |
| 3,162,025 | 12/1964 | Benson | 64/21 |
| 3,362,192 | 1/1968 | Orain | 64/21 |
| 3,792,598 | 2/1974 | Orain | 64/8 X |
| 3,990,267 | 11/1976 | Orain | 64/21 |
| 4,078,400 | 3/1978 | Krude | 64/21 |

FOREIGN PATENT DOCUMENTS

| | | | |
|---|---|---|---|
| 1210264 | 2/1966 | Fed. Rep. of Germany | 64/21 |
| 2039965 | 2/1972 | Fed. Rep. of Germany | 64/21 |
| 2225499 | 12/1972 | Fed. Rep. of Germany | 64/21 |
| 744111 | 4/1933 | France | 64/7 |
| 545796 | 7/1956 | Italy | 64/8 |
| 207846 | 2/1968 | U.S.S.R. | 64/8 |

Primary Examiner—Leslie Braun
Attorney, Agent, or Firm—McGlynn and Milton

[57] ABSTRACT

A constant velocity joint for transmission of rotary motion between two angularly-displaceable shafts to maintain velocity of a driven shaft equal with a driving shaft regardless of the angular relationship of the two shafts. A ball-shaped member is rotatable about a first axis and is disposed and received in an outer member which is rotatable about a second axis. The ball-shaped member is fabricated from identical stamped metal halves which are welded together to form a hollow ball. Rotary motion is transmitted between the ball-shaped member and the outer member by diametrically opposed cam rollers which are rotatably supported on shafts which are fixedly attached to the outer member. The cam rollers engage flanges which extend inwardly from the edges of slots in the ball-shaped member. The outer member has a cup-shaped socket configuration which is complementally shaped to receive the ball-shaped member. The open end of the outer member includes an annular flange. The ball-shaped member is retained in the outer member by retaining rings which form an inner diameter smaller than the diameter of the ball-shaped member. The retention ring has an axially-extending lip which extends over the outer periphery of the annular flange of the outer member and the assembly is enclosed by a resilient boot seal.

17 Claims, 3 Drawing Figures

CONSTANT VELOCITY JOINT

BACKGROUND OF INVENTION

(1) Field of Invention

The subject invention relates to an improved constant velocity joint for transmission of power between two angularly-displaceable shafts. In a typical universal joint or Cardan joint, the velocity or rpm of the input shaft is equal to the velocity or rpm of the output shaft when the two shafts are coaxially aligned. However, when the output shaft is disposed at an angle with respect to the input shaft, the output shaft velocity is not constant or equal to that of the input shaft. In fact, the output velocity or rpm of the output shaft in such a situation is sinusoidal with respect to the velocity or rpm of the input shaft. Vehicles with front-wheel drive require a special front-wheel suspension wherein the front axle contains a constant velocity joint in order to provide flexibility when going over bumps or especially when turning or cornering. Constant velocity joints are used to overcome sinusoidal motion of the output shaft. In other words, the output shaft, which is connected to a front wheel, will rotate at the same velocity or rpm as the input shaft or drive axle no matter what the angle between the output shaft and the drive axle, as in hitting bumps or during turning or cornering.

(2) Description of the Prior Art

Typically, the prior art constant velocity joints provide for the constant transmission of rotary motion between two angularly-displaceable shafts. As is known in the art this is accomplished by constant velocity joints having an outer member and an inner member which are operatively connected by lost motion torque transmitting means. The torque transmitting means is generally comprised of balls in a cage, pivot means projecting transversely from one end of a shaft member, or by rollers mounted in a cup or ball and engaging slots in the other member. Typically, the components of the prior art constant velocity joints have close manufacturing tolerances and must be casted and machined separately and then assembled.

In addition, although typical prior art constant velocity joints compensate for any misalignment of the two rotating shafts, the prior art constant velocity joints do not allow for axial movement between the outer member and the inner member. Lateral or axial movement between the inner member and outer member is particularly desirable in a constant velocity joint when a vehicle is turning or cornering as will be later described in more detail.

SUMMARY OF INVENTION

The subject invention relates to a constant velocity joint comprising a hollow ball-shaped member rotatable about a first axis disposed in an outer member rotatable about a second axis and motion transmitting means for transmitting rotary motion between the hollow ball-shaped member and the outer member when the axes are coaxial as well as when the angle between the first and second axes varies. The hollow ball-shaped member can be fabricated from two identically-stamped halves which are then fastened together by welding, or the like. Additionally, the subject invention provides a constant velocity joint including retaining means for retaining a ball-shaped member in the outer member and for allowing axial movement between the outer member and the ball-shaped member.

PRIOR ART STATEMENT

A constant velocity joint fabricated from parts which must be machined and cast separately is shown in the U.S. Pat. No. 2,487,485, granted Nov. 8, 1949 to J. C. Smiley, Jr. The constant velocity joint disclosed in this patent has a ball-shaped member disposed in an outer member operatively connected by motion transmitting means comprised of studs or lugs which employ frictional contact. A constant velocity joint employing roller bearings to provide contact between an inner member which terminates in radially outwardly extending pins into an outer member is shown in U.S. Pat. No. 3,008,311, granted Apr. 29, 1960 to P. J. Mazziotti. In addition, this patent also discloses the use of a boot seal. A constant velocity joint employing cam rollers engaging slots as the motion transmitting means is shown in U.S. Pat. No. 3,162,025, granted Oct. 24, 1962 to C. F. Benson. The U.S. Pat. No. 3,362,192, granted May 25, 1966 to M. Orain discloses a constant velocity joint wherein balls are positioned in a cage and the balls are received by grooves in an outer member and an inner member and serve as a motion transmitting means. The problem with these contant velocity joints, as alluded to above, is that they are fabricated from parts which must be casted and machined separately and then assembled. In addition, the prior art constant velocity joints do not allow for any appreciable lateral or axial movement with respect to the outer member and inner member which results in close manufacturing tolerances. This feature of axial movement also allows the axle of a vehicle to shift slightly when the vehicle is cornering so that there is a shift in the center of gravity which will result in much improved handling characteristics when turning or cornering.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF PREFERRED EMBODIMENT

Figure 1:
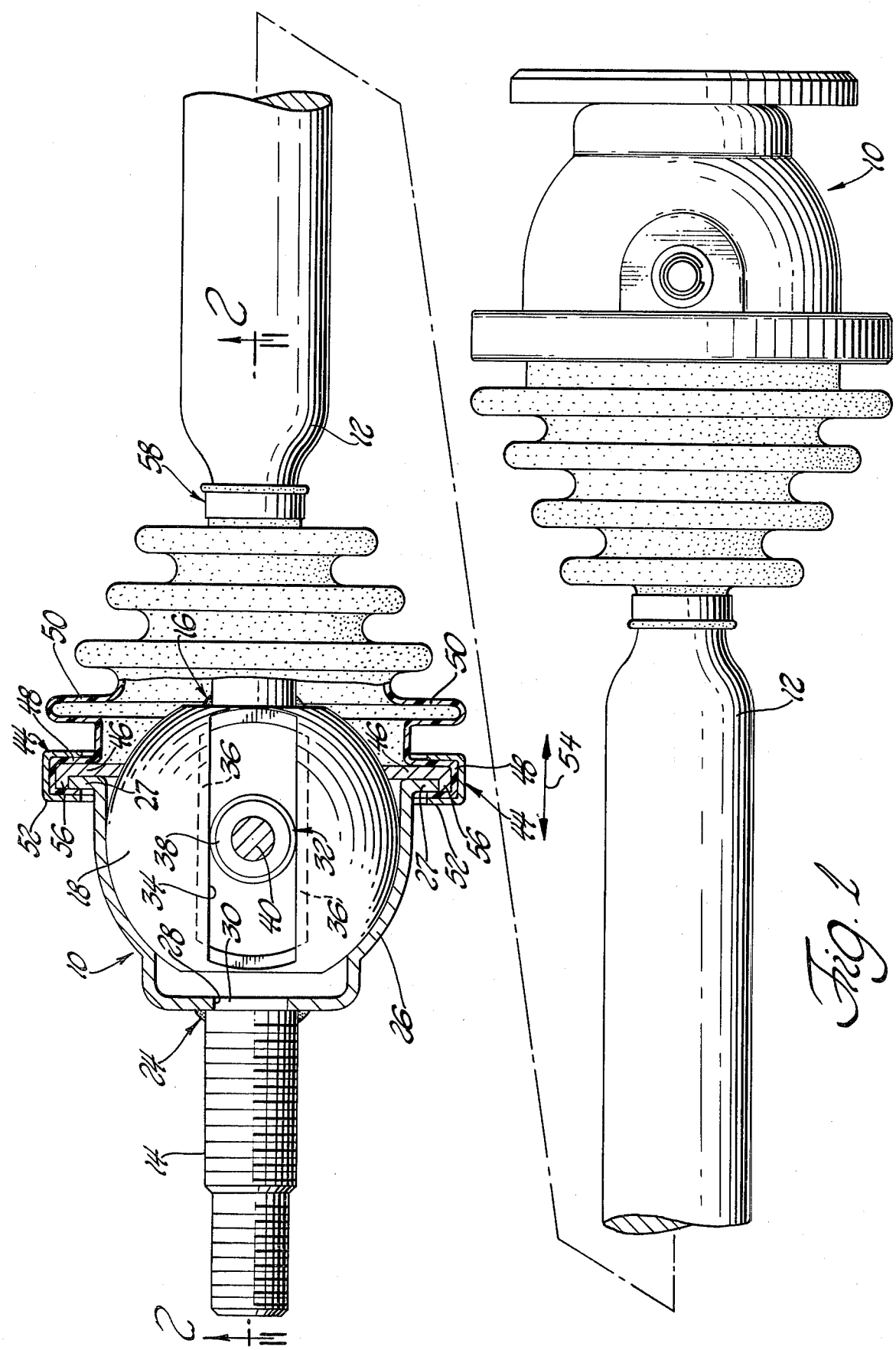
FIG. 1 is a view partially broken away and in cross section of a vehicle axle assembly and a constant velocity joint constructed in accordance with the instant invention.
Figure 2:
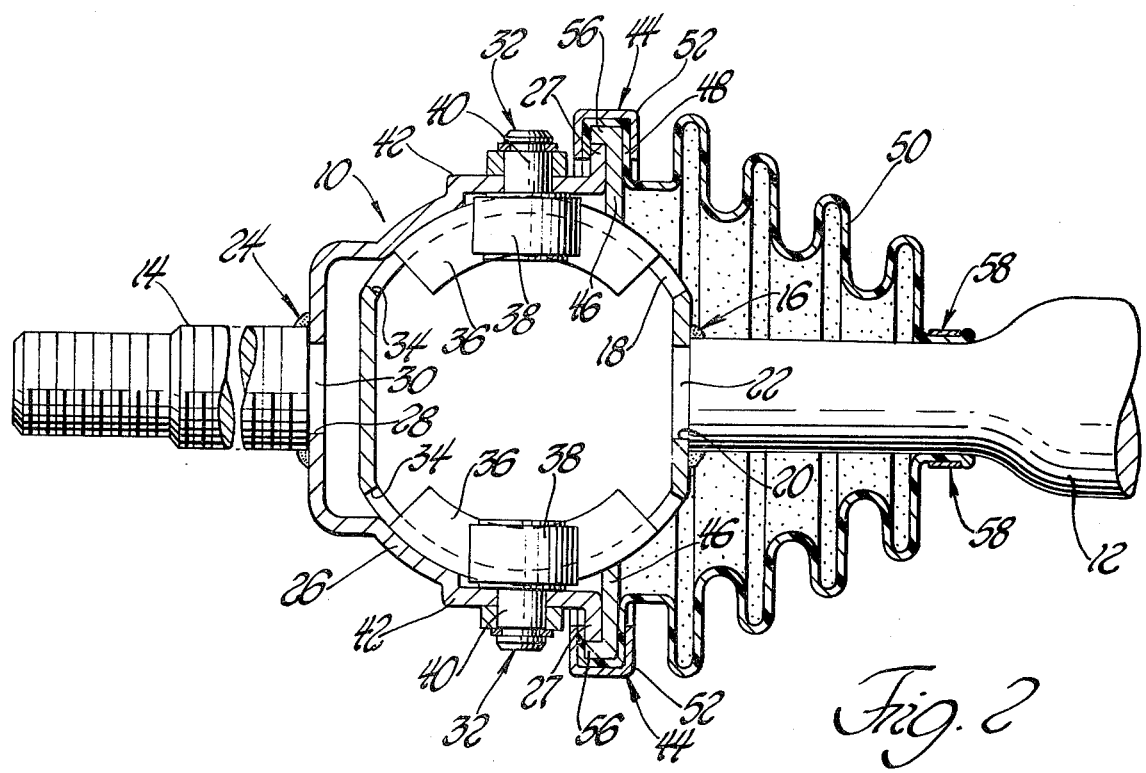
FIG. 2 is a fragmentary cross-sectional view taken along line 2—2 of FIG. 1.
Figure 3:
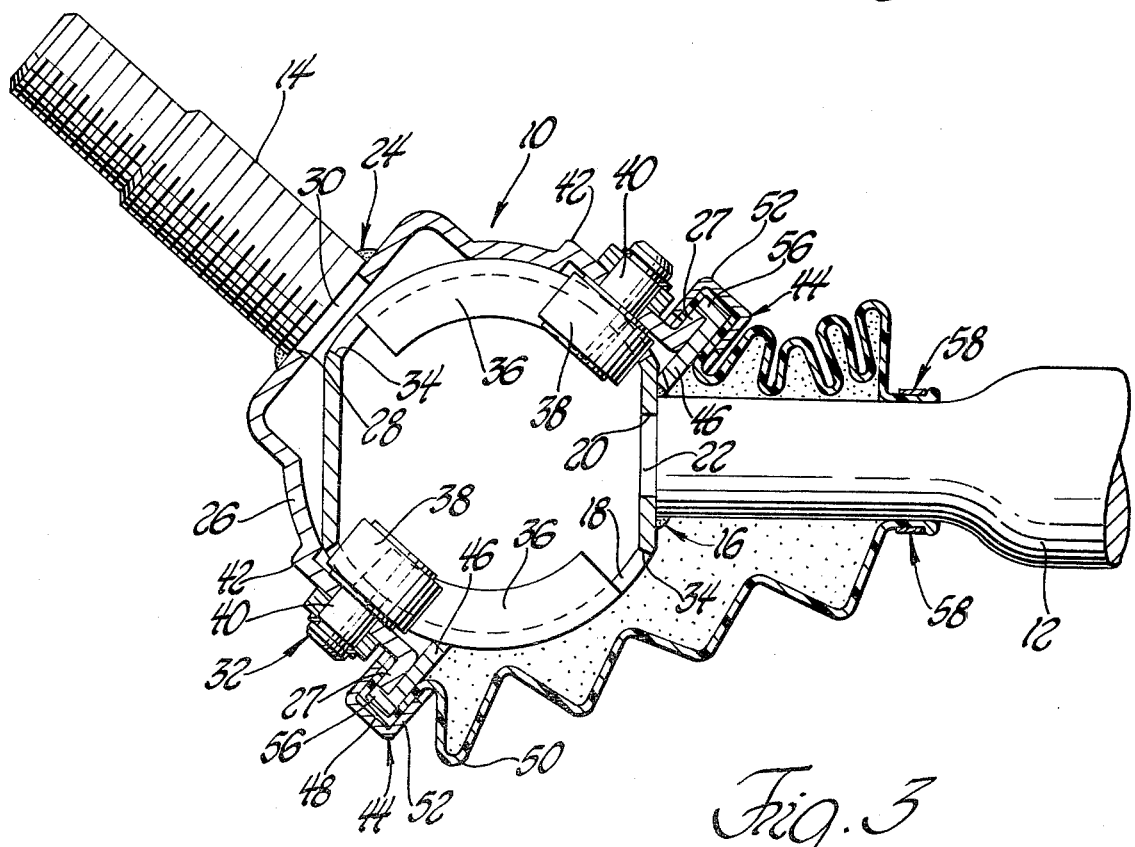
FIG. 3 is a cross-sectional view showing the velocity joint of FIG. 2 disposed at an angle.

A constant velocity joint is shown in FIGS. 2 and 3 with the constant velocity joint generally indicated at 10 and is driven by an axle or input shaft 12. The assembly includes an output shaft 14 for driving a front wheel of a vehicle. As the assembly is shown in FIG. 1, the constant velocity joint 10 at the top of FIG. 1 transmits driving force from the input shaft 12 to the output shaft 14 which attaches to and drives the front wheel of a vehicle. The constant velocity joint 10, at the bottom of FIG. 1 transmits driving motion transmitted from a flange which is connected to the constant velocity joint. The flange is driven by driving connection with the drive differential of a vehicle. As a result, the constant velocity joint 10, at the bottom of FIG. 1, transmits driving motion from the drive differential to the input shaft 12.

Referring to the assembly shown in FIGS. 2 and 3, the input shaft 12 is connected by welding, or the like, as is well-known in the art and is generally indicated at 16 to an inner hollow ball-shaped member 18. The hollow ball-shaped member 18 has an opening 20 to receive a projecting portion 22 of the input shaft 12 in order to provide additional support for the attachment generally indicated at 16. In like manner, the output shaft 14 is connected by welding, or the like, and is attached as is generally indicated at 24 to an outer member 26. The outer member 26 has an opening 28 to receive a projection 30 of the output shaft 14 in order to provide additional support to the attachment 24. It is also understood that as required in FIG. 1, it would be known in the art to arrange the assembly whereby an input is connected to the outer member 26 while the inner hollow ball-shaped member 18 is connected to an output, and vice versa.

Still referring to the assembly as shown in FIGS. 2 and 3, the hollow ball-shaped member 18 is rotatable about a first axis, i.e., axis of shaft 12, while the outer member 26 is rotatable about a second axis, i.e., axis of shaft 14. The hollow ball-shaped member 18 is fabricated from identical stamped metal halves which are then fastened together by welding or the like, to define the hollow ball-shaped member 18. The hollow ball-shaped member 18 is disposed in the outer member 26. The outer member 26 is defined by a cup-shaped socket configuration which is complementally-shaped to receive the hollow ball-shaped member 18. The open end of the outer member 26 terminates by forming annular flanges 27 at each end.

The outer member 26 and the inner ball-shaped member 18 are operatively connected by motion transmitting means generally indicated at 32 which transmit rotary motion between the ball-shaped member 18 and the outer member 26. As is well-known in the art of constant velocity joints, a constant rotary motion is transmitted between the ball-shaped member 18 and the outer member 26 when the axes 12 and 14 are coaxial as shown in FIG. 2 as well as when the angle between the first and second axes 12 and 14 varies as is shown in FIG. 3.

The ball-shaped member 18 has connecting means for receiving the motion which is transmitted from the motion transmitting means 32. the connecting means on the ball-shaped member 18 is comprised of diametrically opposed slots 34. As is best seen in the top view of FIG. 1, there are flanges 36 extending inwardly from each edge of each slot 34 in the ball-shaped member 18.

The motion transmitting means 32, as discussed above, is comprised of diametrically opposed cam rollers 38 which are rotatably supported on shafts 40 which are fixedly attached to the outer member 26 by welding or the like. The cam rollers 38 transmit rotary motion between the ball-shaped member 18 and the outer member 26 by engaging the flanges 36 of the slots 34 of the hollow ball-shaped member 18. The cam rollers 38 move along the slots 34 and continue to transfer rotary motion from the input shaft 12 to the output shaft 14 when there is a misaligning thrust between the axes 12 and 14 as occurs when cornering, turning or going over rough terrain.

The cam rollers 38 are supported on a flat portion or cylindrical portion 42 on the outer member 26. The cylindrical portion 42 of the outer member 26 is formed by a flattened portion of the outer member 26 extending axially from the annular flange 27 of the outer member 26. It is understood that it would be known in the art to employ any arrangement and number of cam rollers and it is understood that it is not intended to be a limitation of the present invention by describing the present invention with the use of two cam rollers which are diametrically opposed.

Referring to the drawings generally, there are retaining means generally indicated at 44 for retaining the ball-shaped member 18 in the outer member 26 and which allows lateral or axial movement between the outer member 26 and the ball-shaped member 18. It is understood that the feature of axial movement in the present invention will work equally well, whether the ball-shaped member 18 is hollow or solid. As will be described in more detail, the retaining means is comprised of the annular flange 27, retention means, resilient means, and attachment means operatively attaching these components thereby allowing axial movement between the outer member 26 and the ball-shaped member 18. More specifically, the retaining means includes a retention means having an inner diameter smaller than the diameter of the ball-shaped member 18. The retention means is comprised of a ring 46 which is disposed adjacent the annular flange 27. It is understood that the ring 46 which forms the retention means can be of any number and shape and is not intended to be a limitation of the description of the present invention. As also indicated, the retaining means further includes attachment means in the form of a clamp means 52 which is disposed over the annular flange 27 and the ring 46. The attachment means or clamp means 52 operatively attaches the retention means, i.e., ring 46, to the outer member 26 for allowing the ring 46 to move relative to the outer member 26 while retaining the ball-shaped member 18 within the outer member 26 thereby allowing axial movement. The allowed axial movement referred to is indicated generally at 54. The clamp means 52 as illustrated in the present invention is in the configuration of a U-shaped clamp. In addition, the ring 46 includes an axially-extending lip 56 extending over the outer periphery of the annular flange 27.

As indicated above, another component of the retaining means is resilient means which is comprised of a portion 48 of a boot seal 50 which encloses the assembly. The resilient means, i.e., portion 48 of boot seal 50, is disposed between the clamp means 44 and at least one of either the ring 46 or annular flange 27 or both as is shown in the present invention, which allows the ring 46 to move relative to the annular flange 27 to allow the axial movement 54. In addition, the boot seal 50 is disposed in sealing engagement generally indicated at 58 with the first shaft or input shaft 12.

Thus, the resilient characteristics of portion 48 of the boot seal 50 which is disposed between the clamp means 52 and the ring 46 and between the clamp means 52 and the annular flange 27 allows for movement. The U-shaped clamp means 52 provides a clearance to allow axial or lateral movement 54 of ring 46 and annular flange 27 of the outer member 26. As a result, the clamp means 52 allows axial movement by allowing the ring 46 to move axially whereby the outer member 26 and ball-shaped member 18 may move axially relative to one another. This axial movement is especially desirable when turning or cornering. When cornering, centrifugal force is forcing the tires on the wheels outwardly with respect to the radius of the turn. Although both wheels are being forced outwardly, the manifestation to the vehicle is that one wheel is being forced outward with respect to the vehicle while the other wheel is being forced inward with respect to the vehicle. By allowing some lateral or axial movement of the axle or driving shaft 12, the center of gravity can shift so that the result will be improved handling characteristics when cornering.

Another important desirable advantage provided by the feature of lateral or axial movement is that manufacturing tolerances may be increased. In other words, the manufacturing and assembly of the present invention is easier and more economical since greater flexibility in manufacturing tolerances is allowed.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A constant velocity joint comprising; a hollow ball-shaped member rotatable about a first axis, an outer member rotatable about a second axis, said hollow ball-shaped member being disposed in said outer member, and motion transmitting means for transmitting rotary motion between said hollow ball-shaped member and said outer member when said axes are coaxial and as the angle between said first and second axes varies, said hollow ball-shaped member having diametrically opposed slots therein and flanges integral with said ball-shaped member and extending inwardly from each edge of each of said slots and into the open hollow of said ball-shaped member, said motion transmitting means including diametrically opposed cam rollers rotatably supported on shafts which are fixedly attached to said outer member so that said cam rollers may engage said flanges.

2. A constant velocity joint as set forth in claim 1 wherein said hollow ball-shaped member comprises two identically-shaped halves.

3. A constant velocity joint as set forth in claim 1 wherein said outer member is defined by a cup-shaped socket complementally shaped to receive said ball-shaped member.

4. A constant velocity joint as set forth in claim 1 including retaining means for retaining said ball-shaped member in said outer member and for allowing axial movement between said outer member and said ball-shaped member.

5. A constant velocity joint as set forth in claim 1 including retaining means for retaining said ball-shaped member in said outer member and for allowing axial movement between said outer member and said ball-shaped member.

6. A constant velocity joint as set forth in claim 5 wherein said retaining means includes a retention means having an inner diameter smaller than the diameter of said ball-shaped member.

7. A constant velocity joint as set forth in claim 6 wherein said retaining means further includes attachment means operatively attaching said retention means to said outer member for allowing said retention means to move relative to said outer member while retaining said ball-shaped member within said outer member thereby allowing said axial movement.

8. A constant velocity joint as set forth in claim 7 wherein said outer member includes an annular flange, said retention means comprising a ring disposed adjacent said annular flange.

9. A constant velocity joint as set forth in claim 8 wherein said attachment means comprises a clamp means disposed over said annular flange and said ring.

10. A constant velocity joint as set forth in claim 9 wherein said retaining means further includes resilient means disposed between said clamp means and at least one of said ring and said annular flange for allowing said ring to move relative to said annular flange to allow said axial movement.

11. A constant velocity joint as set forth in claim 10 including a boot seal enclosing said assembly, said resilient means comprises a portion of said boot seal.

12. A constant velocity joint as set forth in claim 11 wherein said ring includes an axially-extending lip extending over the outer periphery of said annular flange.

13. A constant velocity joint as set forth in claim 12 including a first shaft connected to said ball-shaped member and a second shaft connected to said outer member.

14. A constant velocity joint as set forth in claim 13 wherein said boot seal is disposed in sealing engagement with said first shaft.

15. A constant velocity joint as set forth in claim 14 wherein said outer member includes a cylindrical portion extending axially from said annular flange, said cam rollers being supported on said cylindrical portion.

16. A constant velocity joint comprising; a ball-shaped member rotatable about a first axis, an outer member rotatable about a second axis, said ball-shaped member being disposed in said outer member, motion transmitting means for transmitting rotary motion between said ball-shaped member and said outer member when said axes are coaxial and as the angle between said first and second axes varies, and retaining means for retaining said ball-shaped member in said outer member and for allowing axial movement between said outer member and said ball-shaped member, said retaining means including a retention means having an inner diameter smaller than the diameter of said ball-shaped member and attachment means operatively attaching said retention means to said outer member for allowing said retention means to move relative to said outer member while retaining said ball-shaped member within said outer member thereby allowing said axial movement, said outer member including an annular flange, said retention means comprising a ring disposed adjacent said annular flange, said attachment means comprising a clamp means disposed over said annular flange and said ring.

17. A constant velocity joint as set forth in claim 16 wherein said retaining means further includes resilient means disposed between said clamp means and at least one of said ring and said annular flange for allowing said ring to move relative to said annular flange to allow said axial movement.

* * * * *